INVENTORS:
NIKOLAUS VON KOTSCHUBEY,
WERNER BUGMANN,
FRANZ MAURER

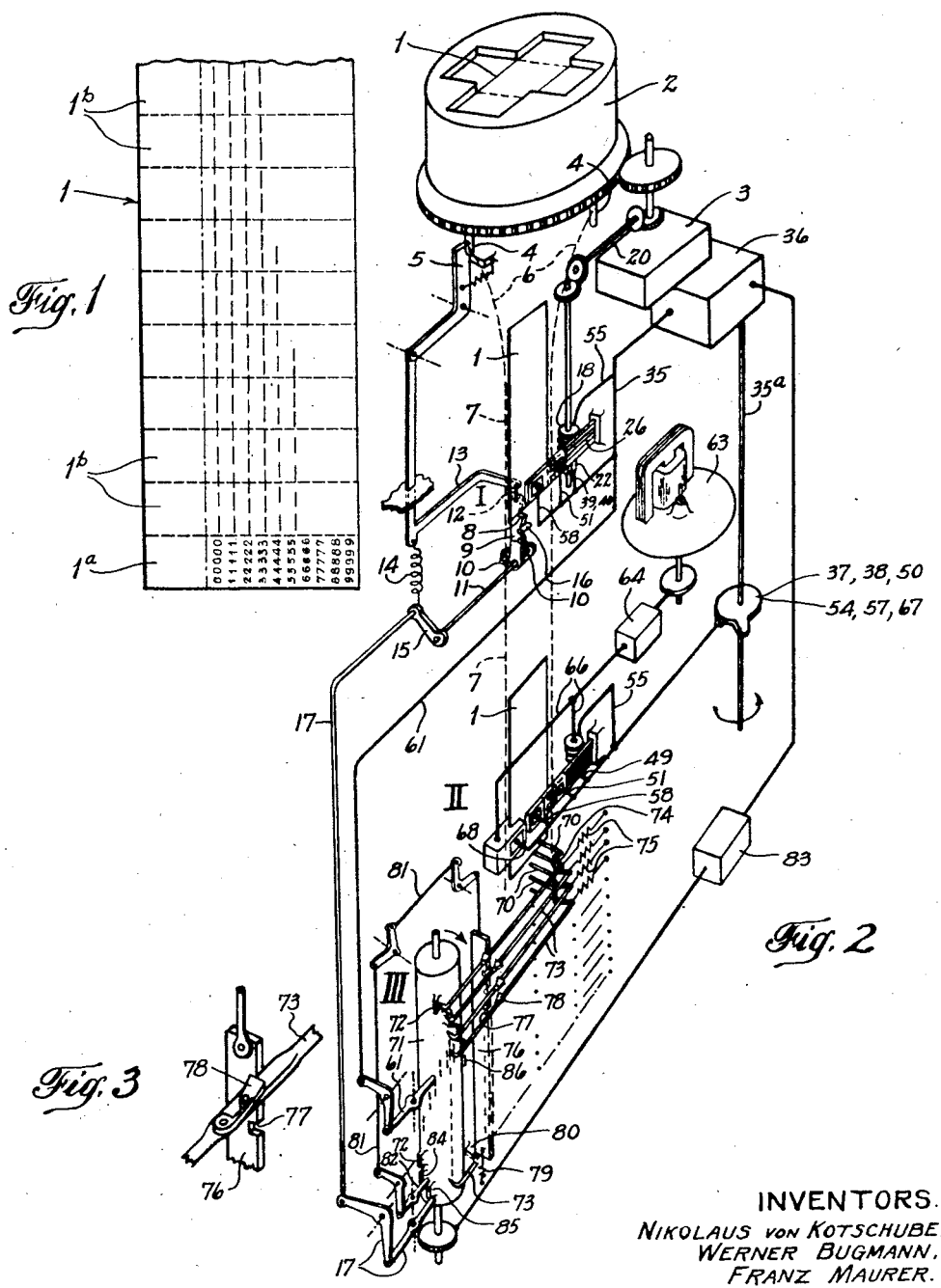

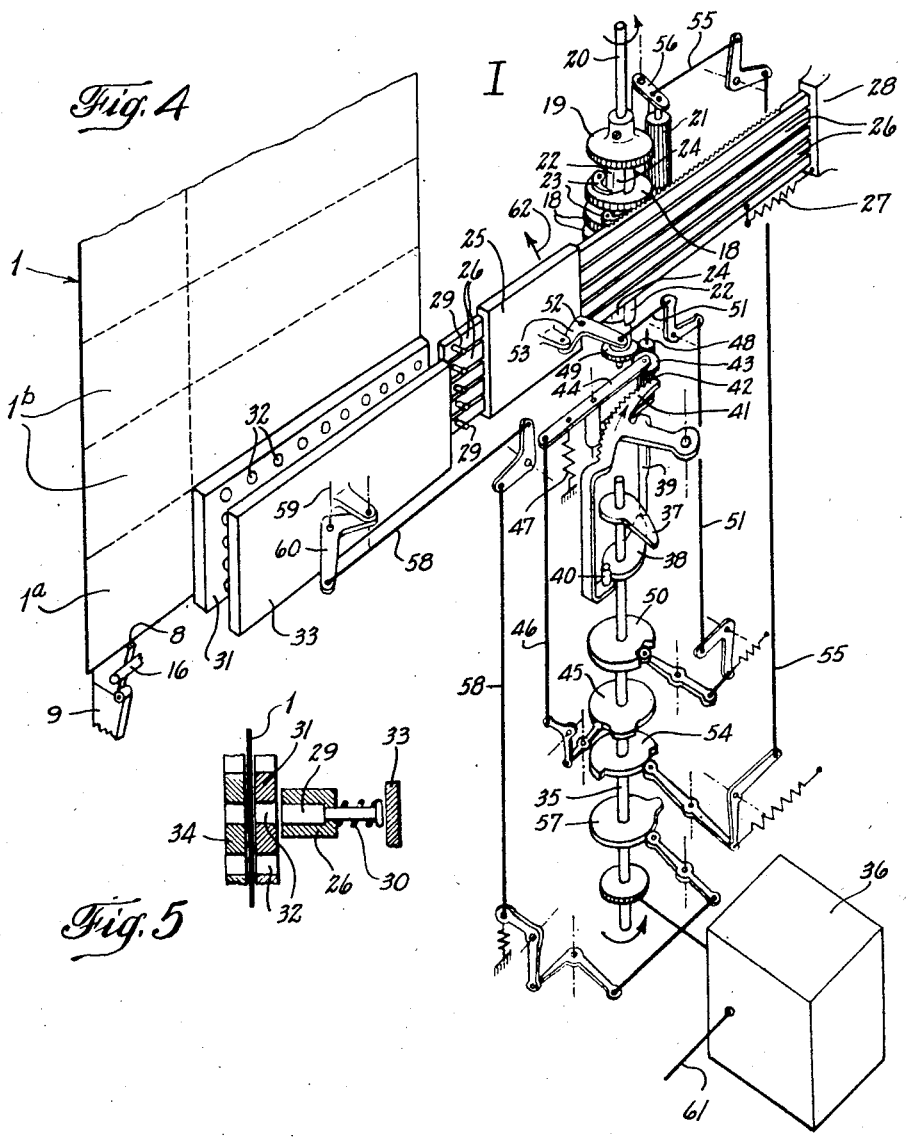

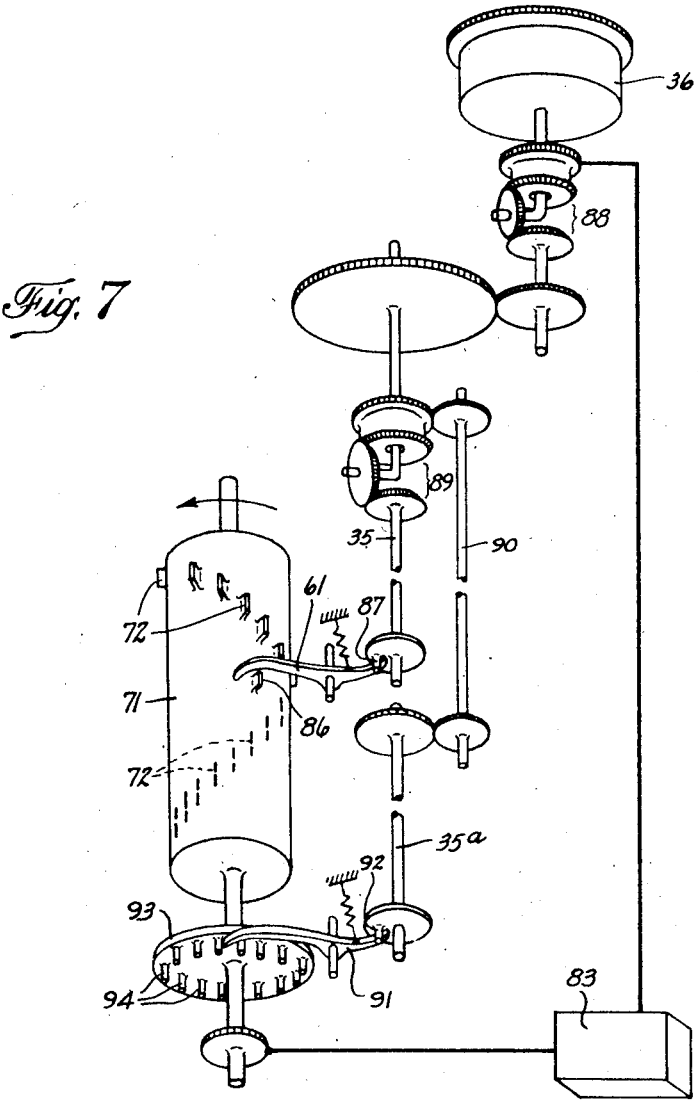

United States Patent Office 2,789,028
Patented Apr. 16, 1957

2,789,028

RECORDING ELECTRICITY METERS

Nikolaus von Kotschubey, Zug, Werner Bugmann, Zurich, and Franz Maurer, Zug, Switzerland, assignors to Landis & Gyr A. G., Zug, Switzerland, a body corporate of Switzerland Application December 10, 1952, Serial No. 325,114

9 Claims. (Cl. 346—78)

The present invention relates to a novel and improved recording electricity meter adapted to make a punched record of the measured values.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The drawing shows a mode of embodiment of the invention diagrammatically and in perspective in which the values are recorded by perforation and also by the printing process. The diagrammatical and perspective representation was chosen so as to make the individual subassemblies of the instrument and their cooperation more readily understandable. Those parts of the apparatus not needed to understand the invention have been omitted.

Figure 1 shows a carrier in the form of a card for recording values and

Figure 2 shows the recording instrument;

Figure 3 is a detail;

Figure 4 shows a servo mechanism for the numbering of the cards, of which

Figure 5 is a detail;

Figure 7 shows part of a control mechanism.

Figure 6:
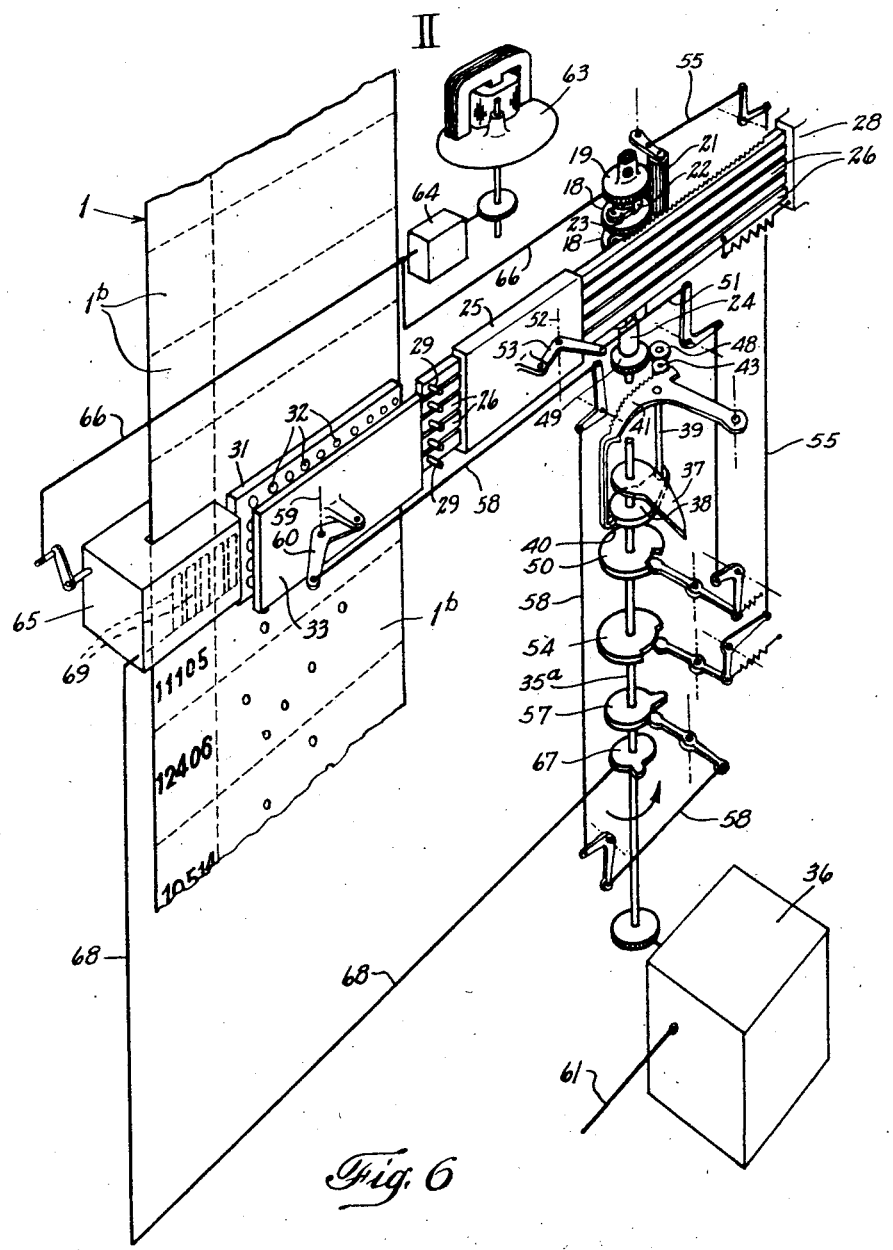
Figure 6 represents a mechanism serving to record on the card consumption values.

The present invention has for its object the provision of a novel and improved electric meter which is provided with recording means for making a punched record of the measured values, the meter operating and controlling the punch-recording means through servo-motor means which provide the needed power for the punching operation without deleteriously affecting the accuracy of the meter.

A further object is the provision of a punched-record type of recording apparatus which is directly associated with and controlled by an electricity meter, such as a demand meter.

The known instruments for the recording of values of an electrical, mechanical or other kind arrange these values on strips of paper, either recording them with points, numbers, lines or puncturing. The recording on such strips extend over days and weeks. The evaluation of such diagrams or numerical orders requires much time and trouble, thus for example where recording of various periods of time are to be compared with each other or where their values are to be added or subtracted, when it is necessary to paste the recording strips over each other or to read, add or subtract some values first.

It is true that adding or subtracting apparatus are old, but their operation requires electric transmission lines, which causes high additional costs and their possible use is restricted by distance.

The purpose of the present invention is to avoid said drawbacks and to offer a recording instrument which makes possible a handy and convenient storage of the carrier of the recording results and their rapid and multiple evaluation.

The recording instrument of the present marks incident values, i. e. those yielding a numbering of carriers for the recording values of points of consumption automatically at least by the perforation of the carrier.

Referring now in detail to the present preferred and illustrative embodiment of the invention as shown in the accompanying drawings, the card 1, as represented in Figure 1, is the recording sheet for the so-called punched card system. It is divided into a field 1ª for the numbering of the card and the fields 1ᵇ for the periodical recording of values, fifteen of such fields being here assumed by way of example. The fundamental principle of the recording instrument is that the cards from a stack are punched in the recording fields in a series periodically with the values incident at the individual periods. In the example of embodiment the values are marked besides by their being indicated in figures, for which purpose a special lettering space is provided for in the fields of the cards.

The recording instrument shows several groups of servo mechanisms; one, which effects the successive numbering of the cards and their passing through at the point where the value is recorded on the cards; a second, which prints and punches the values and a third, which produces the periodical transportation of the cards when the values are printed and punched.

For the better explanation of the matter, notations in series of 0–9 are entered in the card notation field 1ª of the card 1 shown in Figure 1, each row corresponding to a decimal place and 5 rows being provided for in each case according to the example, so that values up to a figure of 99999 can be marked. In reality the cards have no imprint of any kind.

In Figure 1 the figures are marked on the card only in one field, namely in that serving to number the cards.

First of all the cards are accommodated in a stacking arrangement. This arrangement is provided with a drum 2 containing the cards 1 stacked crosswise. Such arrangements are known per se, they deliver a card at each quarter turn, that is they drop out of the drum. In the example of embodiment the drum is influence by a clock mechanism 3 which tends to turn the drum, but four stops 4 distributed on the drum in a circle together with a ratchet 5 regulate the advance of the drum 2 in a manner explained later on.

From the drum 2 the card 1 passes into a funnel 6 which places the card sliding in it in a vertical position and guides it into a shaft 7. In said shaft 7 the cards impinge on a stop 8 of an arresting arrangement. The stop 8 is fitted to a toggle lever 9 which is arranged on the one hand between the stops 10 of a shaft 11 and loosely rotatable on the latter, and is connected on the other hand by means of a guide 12 to a thrust member 13 and is kept in the arresting position by means of a spring 14 between the thrust member 13 and a crank 15 on the shaft 11 in a stretched position applied to a stationary pin 16, the stop 8 holding the card 1 in its position in the shaft 7 appropriate for its being numbered. The crank 15 is connected by means of a rod 17 operatively to a switch mechanism which incorporates the third servo mechanism and the construction and action of which will be described later.

The arresting arrangement containing the toggle lever 9 forms together with an adjusting and punching mechanism group I of the servo mechanisms. Corresponding to the assumed five places of figures this adjusting mechanism has five rolls 18, corresponding to the digits, tens, hundreds, thousands and ten thousands, and must be imagined with regard to the switching of the rolls to be like an ordinary known counting mechanism, that is to say that from a driving gear 19 (Figure 4) driven by clockwork 3 by means of shafts 20 the gear 19 is imparted a movement dependent in each case on the partial rotation of the drum 2 of the stacking arrangement which is transmitted by the well-known tens-drives 21 to the rolls 18. Instead of the usual figure notation the rolls 18 are provided with teeth. They are mounted to turn loosely on a hollow shaft 22 and are each operatively connected by means of a ratchet 23 to a notch 24 of the hollow shaft 22.

On a plate 25 five rods 26 are arranged to be slidable in a longitudinal direction, and the plate 25 must be imagined as being guided transversely to itself so that the rods 26 together are movable parallel to themselves. With the toothed portion the rods lie each within the range of one of the toothed rolls 18 and in the position of rest they are disengaged from the toothed rolls each by means of a draw spring 27 (for the sake of clearness only one is shown in the drawing) held against a stationary abutment 28. The rods 26 have a horizontal position and are provided with punches at their ends which are turned away from the abutment. As shown in Figure 5, said punches 29 are retained, each by means of a spring 30, in the rod 26.

In front of the field 1ª for the numbering of the card 1 kept in position by the stop 8, there are arranged a plate 31 with the guide holes 32 corresponding to the numbering of the card and a printing plate 33, and these plates 31 and 33 are so spaced apart that the rods 26 with the punches 29 may pass freely between them. On the other side of the card 1 a stationary abutment plate 34 is provided with perforations corresponding to those of plate 31.

The tens shifting drives 21 and the hollow shaft 22 forming with these and the rolls 18 together with the thrust rods 26 a first adjusting mechanism, as well as the first perforating arrangement formed by the plates 31, 33, are driven by means of a second clockwork 36, and in order to grasp more quickly the cooperation of the various groups of servo mechanisms there are indicated in Figure 2, which shows the recording instrument as a whole, the connections by means of lines of effect, 35 in Figure 2 thus corresponding to the camshaft in Figure 4 indicated by the same number.

The camshaft 35 has a double cam 37, 38 cooperating with pins 39, 40 of a tooth segment 41. The tooth segment 41 meshes with a drive 42 forming a whole with a toothed wheel 43 which can be shifted vertically with a yoke 44 serving as a bearing for it. This displacement is produced by means of a cam 45, which acts on the yoke 44 by means of the rod 46. In a definite position of the yoke 44 determined by the pull of the spring 47, in which the cam 45 does not affect the rod 46 the gear 43 is engaged by means of an intermediate gear 48 with a gear 49 which is fixed to the hollow shaft 22. A cam 50 of the camshaft 35 acts by means of a rod 51 on the bell crank 53 rotatable about the fixed point and hinged to the plate 25. Another cam 54 of the camshaft 35 acts by means of a rod 55 on a swivel bow 56 in which the tens shifting drives 21 are mounted. The last cam 57 on the camshaft 35 acts by means of a rod system 58 and a bell crank 60 pivoting about a fixed axle 59 on the printing plate 33.

The release of the camshaft 35 for one revolution is effected by means of the previously mentioned switching arrangement incorporating the third servo mechanism, the construction and effect of which is for the moment of no interest and of which it may be said now only that it releases the camshaft 35 by means of a lever 61 at a point of time which, as assumed in the example, occurs approximately in the first third of the periodical value perforations, as remains to be described.

In the basic or rest position of the first servo mechanism described the rods 26 with their teeth are disengaged from the toothed rolls 18 and the ratchets 23 of the toothed rolls 18 engage in the notch 24 of the hollow shaft 22, the tens shifting drives 21 mesh with the gear 19 and the rolls 18, the rods 26 are contiguous with the abutment 28 and are together with their punches 29 in a path permitting free movement of the rods and punches between the perforated plate 31 and the printing plate 33.

By means of a stop 8 a card 1 in the shaft 7 has been arrested in such a position that its field 1ª, that is the part serving for the numbering of the cards, is found between the perforated plate 32 and the abutment plate 34.

In Figure 4 it is assumed that the card 1 which is for the moment in the arrested position for numbering is already the third since the beginning of the recording which may extend to a cycle of greater time interval (say about a month). Therefore the ratchet 32, previously set in connection with the temporary travel of the drum 2, does not engage at the first roll 18, i. e. the one incorporating the digit place, in the groove 24, but lies with its roll turned back correspondingly against the hollow shaft 22. This is so because the adjusting mechanism of this servo mechanism I must count continuously, its indications being in each case a sum.

Now if the switch gear of the third servo mechanism effects by means of the lever 61 with connected transmission gears the release of clockwork 36 the cam shaft 35 makes one rotation. During this event first the pin 39 of the tooth segment rises on the cam so that the tooth segment 41 is turned in the direction of the arrow indicated and the hollow shaft 22 makes in its turn a rotation so that the groove 24 recedes from the ratchets 23, this producing again the same setting of the hollow shaft 22 relative to the rolls 18 that existed before. During this rotation of the tooth segment 41 the cam 38 has no effect on the pin 40 as the radius on which the pin 40 moves runs past the periphery of the hub part of the cam.

Simultaneously with the beginning of the turning of the hollow shaft the cam 50 moves, by means of the rod system and the bell crank 53, the plate 25 with the rods 26 remaining parallel to itself in the direction of the arrow 62, so that the teeth of the rods 26 engage with the toothed rolls 18. Thus the toothed rolls 18 are stopped by the rods 26 during the rotation of the hollow shaft 22 that has been mentioned.

In the course of the further rotation of the camshaft 35 the cam 54 moves the rod system 55, and swings the bow 56 with the tens switch drives 21 out of the gear 19 and the rolls 18.

On further rotating the camshaft 35 the cam part of 38 impinges on the pin 40 which it carries along turning the tooth segment 41 opposite to the previous direction. This turns the hollow shaft 22 in the opposite direction to the previous one for one rotation, carries along the rolls 18 by means of the ratchets 23 and pushes the rods into the space between the plates 31, 33. With the exception of the first rod 26 all the rods are here pushed such a distance that their punches 29 are positioned in the axis of the holes 32 in the plate 31 which correspond to the figures "0" of the card 1. As the hollow shaft 22 must first execute a certain angular rotation until its groove 24 catches the ratchet 23 of the first roll 18 to carry along this roll, the first rod 26 is moved less far between the plates 31, 32, so that its punch 29 is positioned in the axis of the hole 32 of plate 31 which lies in the digit series and there corresponds to the number "3."

On continuing the rotation of the camshaft 35 the cam 57 moves for a moment the printing plate 33 by means of the rod system 58 and the bell crank 60 toward the plate 31 and thus presses the punches 29, guided by the holes 32, through the card 1, so that the latter is perforated at four places marked "0" and at the fifth place marked "3" (the digit place). The pressure exerted by the springs 30 causes the punches 29 to return again at once to their former position in the rods 26.

The continued turning of the camshaft causes the cam 45 to act, and the latter lifts for a short time the bow 44 with the result that for this time the gear 43 is lifted out of the intermediate gear 48. This disengagement frees the hollow shaft 22 and the latter is retracted together with the rods 26 by the springs 27 to be stopped by 28. In this retrograde movement the uppermost rod 26, thus the one corresponding to the digit place, is the first to strike the abutment 28, as it was this rod that was cut in circuit later and the ratchet 23 of its figure roll 18 is left at the hollow shaft 22, while the rest of the rods 26 with their figure rolls 18, the ratchets 23 and the hollow shaft 22 continue to move until they impinge on the abutment 28, in which position the hollow shaft 22 occupies again its original position. Immediately thereafter the cam 45 releases the bow 44 and the gear 43 engages again in the intermediate gear 48.

The continued turning of the camshaft 35 and the cam 54 releases the rod system 55 and the tens shift drives 21 engages again the gear 19 and the toothed rolls 18.

At the end of the rotation of the camshaft 35 the cam 50 releases the rod system 51 so that the plate 25 is moved opposite to the direction of the arrow 62 and the rods 26 are disengaged from the toothed rolls 18.

The cam shaft 35 has now completed its rotation, it is again locked by the clockwork 36, and the card numbering mechanism is again ready for the next operation, according to the example assumed, for the numbering of the next card 1.

Servo mechanism II, which effects the punching and printing of the consumption values to be recorded, is operatively connected not only to the second clockwork 36 but also to the member of the recording instrument which renders the incident values of consumption numerically evaluable. In this case the member is the driving disc 63 of an electrical driving system which acts by means of a storage mechanism, as indicated by the lines of force 66 in Figures 2 and 6, on the punching arrangement and on an arrangement 65 which prints the values. Such arrangements are old, and the one employed here has naturally 5 figure places to correspond with the field divisions on the card 1.

Except for a small divergence, the punching arrangement of this second servo mechanism II shows the same construction as the first servo mechanism I which produces the numbering of the cards and the same parts are therefore provided with the same reference symbols and there are again on a cam shaft 35ᵃ, driven from the clockwork 36, the cams 37, 38, 50, 54 and 57, only the cam 45 is omitted, because in this case the adjusting mechanism begins to count after each recording period from the beginning, on account of which the toothed rods 26 return to their basic position without engaging with the figure rolls.

On the camshaft 35ᵃ an additional cam is arranged 67 which, as shown by the line of force 68, is connected operatively with the hammers 69 of the arrangement 65 that prints the values.

By means of the various cams 37, 38, 50, 54, 57 and 67, which are shown in Figure 2 symbolically by a single cam, which was given the reference symbols of these cams that have been explained in the specification, there are driven and controlled the setting mechanism, the punching arrangement and the value printing mechanism, except the omission mentioned (the lack of the cam 45 releasing the hollow shaft 22), as in the servo mechanism 1, except that the operation is periodical and, in the case of the example of embodiment, is parallel to the arrangement 65 which prints the values.

The card 1 which is in the shaft 7 stands at every period of its passage through the zone of the servo mechanism II, with its lower edge on a supporting pin 70 projecting into the path of the card determined by the shaft 7, and there are arranged below one another in the shaft such a number of supporting pins 70 as there are field divisions 1ᵇ of the card which receive periodically the print or perforation respectively, that is to say that according to the example of embodiment 15 of these pins 70 must be provided for. These pins are part of a third servo mechanism III containing a switch gear, a precise description of which will follow.

The second servo mechanism II is operated each time at the end of a period as in the old recording apparatus, driven by the clockwork 36. In this operation the value yielded in the period is on the one hand set by the adjusting mechanism 18, 19, 21—30 in the punching mechanism 31—33 and punched by the latter into the card 1, that is to say the card is perforated, and the hammers 69 of the printing mechanism 65 are also released by the cam 67 by means of 68 with the result, as indicated in Figure 6, that the value is also recorded on the card in print. During the operation of this second mechanism II the storage mechanism 64 accumulates value impulses in the well-known manner, to feed them afterwards to the servo mechanism.

The switch gear of the third servo mechanism III which was mentioned before, is provided with engaging pieces 72 on a vertical roller 71 distributed along a helical curve on the circumference and length of said roller corresponding to the number of period fields 1ᵇ of the card 1. Each of said engaging pieces 72 is operatively connected to a hooked draw bar 73, which is connected by means of a bell crank 74 to the appropriate supporting pin 70 and is influenced by a draw spring 75. A thrust bar 76 is arranged transversely to the hooked draw bars 73 and parallel with the roller 71. Said bar 76 is provided with recesses 77 according in number to the number of hooked draw bars 73, which recesses cooperate with the spring ratchets 76 arranged on the hooked draw bars 73. In the position of rest the thrust bar 76 is kept in contact with a fixed stop 80 by means of a draw spring 79, in which position the recesses 77 and the spring ratchets 78 have no effect on each other, and it is operatively connected by means of a rod system and a lever 82 to an engaging piece 84 on the roller 71.

The operative connections of the parts 70—82 to the passage of the card 1 according to the periodical operation of the second servo mechanism is so constituted that at the beginning, i. e., before the card 1 has received a periodical recording of value, all the supporting pins 70 are situated in the path of the card. The card then stands on the uppermost pin 70 and its first field 1ᵇ is within the range of the punching arrangement and the printing arrangement of the second servo mechanism. When the recording of the value in said field 1ᵇ has been effected, the uppermost engaging piece 72 of the roller 71 driven by the clockwork 36 by means of an escapement 83 according to the periods, retracts the uppermost hooked draw bar 73 in opposition to the pull of the spring 75. By this means the supporting pin 70 connected to said bar is withdrawn from the path of the card 1, and said hooked draw bar 73 is stopped by means of its spring ratchet 78 at the thrust bar 76 by the ratchet 78, first evading the thrust bar 76, then passing behind the latter (Figure 3). On account of the withdrawal of the uppermost supporting pin 70 in the shaft 7 the card 1 drops onto the second pin 70, by which means it comes with its second field 1ᵇ into the range of the perforating arrangement and the printing arrangement of the second servo mechanism.

The operation of the parts 70—76 which has been described proceeds in the direction of the recording periods until the card 1 has passed through the point of the servo mechanism II and said card provided with the value recordings in all its fields 1b drops through the shaft 7 out of the recording instrument, there being preferably arranged a collector for the cards provided with the records, which collector is, however, not represented because it is old and well-known.

When the roller 71 is turned after the withdrawal of the last hooked draw rod 73 within the immediate period, the engaging piece 84 on the roller 71 temporarily swings out the lever 82, and the rod system 81 lifts the thrust bar 76 for a moment so that the recesses 77 are placed in front of the spring ratchets 78 permitting the return of all the supporting pins 70 to the path of the cards.

Also, when the roller 71 is turned after the withdrawal of the last hooked draw bar 73 and after the release of said bars, another engaging piece 85 still acts within the same period temporarily on the rod system 17 of the servo mechanism I and bends the bell crank 9 by means of the front stop 10, so that the nose of the stop 8 releases the card 1 which is in the numbering position of shaft 7, the card dropping on the uppermost supporting pin 70 and thus takes its position with the first field 1b before the perforating and printing arrangement of the servo mechanism II. Bending the bell crank 9 also leads to the release of the ratchet 5 from the respective stop 4 so that the drum 2 is turned by the clockwork 3 and the undermost card is released from the stack of cards in the drum 2 and is guided by the funnel 6 into the shaft 7. However, the rod system 17 returns immediately to its original position, the rearward stop 10 extending the bell crank 9 again and the stop 8 reentering the path of the cards in the shaft 7 and arresting the new card 1 coming out of the funnel in the numbering position. The reextension of the bell crank 9 also causes the ratchet 5 to pass again into the locking position and to rearrest the drum 2 after a quarter of a turn at the next stop 4.

The point of time at which the numbering of the card 1 in the number position, thus in the region of the servo mechanism I, takes place and of which it was said that it was approximately in the first third of the periodical value punching position, is assumed according to the example to be after the fourth periodical release of the card in the servo mechanism II. It is determined by means of an engaging piece 86 acting on the lever 61 which when actuated by the engaging piece 86 releases in its turn a pin 87 on the camshaft 35, thus permitting this camshaft to effect the rotation previously explained.

As shown by Figure 7 the material means used here are differential gears 88, 89 and an intermediate shaft 90 in the motion transmission mechanism from the clockwork 36 to the camshafts 35 and 35a. The various cams on these shafts are not shown again in this Figure 7, as they were explained previously in connection with the respective mechanisms. If the mentioned actuation of the lever 61 and the release of the camshaft 35 take place the axis of the planet wheel of the differential gear 89 is released for rotation, and its planet wheel revolves between the sun wheels of this gear 89, the camshaft 35a being stopped by means of a lever 91 and a pin 92 thus stopping the one sun wheel of the differential gear 89 by means of the intermediate shaft 90. The force is therefore transmitted in this case from the clockwork 36 by way of the lower sun wheel of the differential gear 88 to the camshaft 35, the servo mechanism I comes into effect and the shaft 35 is stopped again by the lever 61 after one revolution.

On the axle of the roller 71 a disc 93 is fixed on which are arranged in a circle pins 94, the number of which corresponds to the number of the recording periods provided for on the cards 1, that is to say that fifteen of such pins are present according to the example of embodiment. The lever 91 cooperates with these pins 94, so that at the end of each recording period the lever 91 is lifted for a moment by a pin 94. Thereby the lever 91 releases the pin 92 and the camshaft 35a is now rotated by way of the intermediate shaft 90 by rolling the planet wheel of the differential gear 89 on the latter's lower sun wheel (which is standing still together with the camshaft 35) for one revolution, so that the servo mechanism II of the recording instrument begins to operate.

It is not absolutely necessary to record the values on individual cards coming from a stack, a wrapping band could also be used receiving the perforations and if necessary the imprints in uninterrupted periodically successive fields. A cutting device before or after the recording of the values can then subdivide the material into individual cards. In that case the stacking arrangement and the means for the periodical progression of the carrier of the recording results would then have to be formed accordingly.

When using cards as the carriers of the recorded values their shape may be of any kind, especially with regard to length, that is the number of fields corresponding to the periods. Preferably the usual format of perforated cards may be employed, which would then make possible the evaluation of the cards in the well-known record card analyzing machines.

The recording of values such as are periodically evaluated as in the so-called Maxigraphs or Printomaxigraphs using the perforated card system offers the great advantage that the carriers of the records, the perforated cards, may be conveniently stored and are always available for evaluation. In addition, combinations of the results of different instruments may be readily effected.

The invention in its broader aspects is not limited to the specific mechanisms shown and described but departures may be made therefrom within the scope of the accompanying claims without departing from the principles of the invention and without sacrificing its chief advantages.

What is claimed is:

1. A recording instrument including a carrier stacking arrangement provided with a first servo-mechanism, consisting of a carrier arresting arrangement and a perforated carrier numeration arrangement, a second servo-mechanism, consisting of at least a perforating arrangement driven in accordance with the consumption values of an electricity meter, and a third servo-mechanism, consisting of a passing-through arrangement for the periodical value recording and a switch gear, and in which clockworks drive or control the servo-mechanisms in such a manner that the carrier numeration point, situated in the path of the card passage through the instrument next behind the carrier stacking arrangement containing the first servo-mechanism the carrier in passing through is perforated first according to the successive numeration and then at the following point of the second servo-mechanism for marking the consumption values the periodical punching of the carrier is effected by the second perforating arrangement, and that the sequence of operations of the various mechanisms and the periodical passing-on of the carrier is controlled by means of the switch gear of the third servo-mechanism.

2. Recording instrument as in claim 1, in which the cards representing the carriers stacked crosswise in a drum of the card stacking arrangement and rolls of an adjusting mechanism of the first perforating arrangement for numbering the cards are driven by means of a first clockwork; in which the member adapted to detect incident numerical values corresponding to the consumption values of an electricity meter drives a setting mechanism of the second perforation arrangement and a second clockwork controls the switching mechanism, by means of a stopping arrangement, a locking arrangement of the card drum for the card at the latter's point of numeration, the periodical passing-through motion of the card at the point corresponding to the marking of the corresponding numerical values, the setting means of the first setting mechanism and the punching mechanism of the second perforation arrangement, the whole being such that the drum of the card stacking arrangement and a card in the numeration position cannot move until a card previously inserted in the instrument has been punched in its periodical passage through the marking point of the incident numerical values, whereupon the switching mechanism releases temporarily the stopping and locking arrangement and in the same period the periodically perforated card in order to establish immediately again the position for the next period for the numbered card now reaching the marking point of the numerical values.

3. Recording instrument as in claim 1, in which the setting mechanisms are provided with gears driven counterlike according to the decimal system and racks with punches, which racks, movable parallel to themselves, can be engaged in and disengaged from the gears, and in which the perforating arrangements have a plate with guiding holes also arranged according to the decimal system and in front of the path of the cards and a printing plate, the engagement and disengagement of the gears and the racks and the movement of the printing plates being effected by controlling means from the second clockwork, the whole being so devised that by means of the gears the racks engaged in them between the guide hole plate and the printing plate with the punches, are placed, through the rotation of the drum or the organ adapted to evaluate the consumption respectively, opposite the guide holes corresponding to the set numerical values and that the punches are briefly pressed into the card behind the guide hole plate by means of the printing plate.

4. Recording instrument as in claim 2 in which the arresting arrangement for the card at its numeration point is formed by a bell crank provided with a stop and in which the bell crank is connected on the one hand to a ratchet consisting of an arresting arrangement with stops distributed in a circle on the card drum, and on the other hand to a rod system controlled by the switching mechanism, a draw spring being arranged parallel with the bell crank between the arresting arrangement and the rod system, the whole being so arranged that at the time when this card is passing through, the switching mechanism temporarily bends the bell crank by means of the rod system and the stop causes the card to drop and the ratchet subsequently releases the drum so that it can rotate, whereupon the rod system that has been released again by the switching mechanism restores again the original position of bell crank and ratchet.

5. Recording instrument as in claim 2, in which there are provided for the control of the card according to its periodical passage through the instrument, at the point corresponding to the marking of the numerical values representing a consumption, supporting pins for the card projecting into the path of the card, their number corresponding to the number of the periods provided for on the card, which pins are pulled in succession out of the path of the card according to the period and after the last of the periods provided for on the card are released again and returned into the path of the card.

6. Recording instrument as in claim 5, in which the switching mechanism is provided with engaging pieces distributed on a helical curve on the circumference and the length of a roller in a number corresponding to the number of the periods provided for on a card, each of the engaging pieces being operatively connected by means of a hooked draw bar provided with a spring ratchet to one of the supporting pins, and in which a thrust bar that is also controlled by an engaging piece of the roller and provided with recesses cooperates with the spring ratchets, the whole being such that the supporting pins are retracted out of the path of the card successively by the engaging pieces and stopped at the thrust bar by the spring ratchets entering the bar recesses in front of the spring ratchets in consequence of the displacement of the bar and permitting the return of the supporting pins to their initial position.

7. Recording instrument as in claim 6, in which between the engaging pieces corresponding to the last and first period of the card division there are arranged two engaging pieces in succession with regard to the rotation of the roller, the first of which is operatively connected to the thrust bar and the second to the arresting and locking arrangement for the card at the latter's point of numeration or to the card drum, so that after the release of the card with the numerical values periodically marked in it the thrust bar passes temporarily into the position permitting the return of the supporting pins whereupon the card kept at the numeration point as well as the card drum are released by means of the arresting and locking arrangement.

8. Recording instrument as in claim 7, in which an engaging piece is arranged on the roller between the engaging pieces for the periodical passing-through of a card, which is operatively connected to the printing plate of the punching arrangement at the card numeration point, so that the numbering of the card at the numeration point takes place in the course of the periodical passage of the card.

9. Recording instrument as in claim 1 in which the second servo-mechanism contains in addition a printing mechanism for the values incident to an electricity meter adapted to be driven and controlled in parallel with the perforation arrangement of said servo-mechanism.

References Cited in the file of this patent

UNITED STATES PATENTS

| | | |
|---|---|---|
| 2,013,530 | Wells | Sept. 3, 1935 |
| 2,518,691 | Horan et al. | Aug. 15, 1950 |